(12) United States Patent
He et al.

(10) Patent No.: US 12,530,762 B2
(45) Date of Patent: Jan. 20, 2026

(54) METHOD FOR MEASURING ACTUAL AREA OF DEFECT, AND METHOD AND APPARATUS FOR TESTING DISPLAY PANEL

(71) Applicant: BOE Technology Group Co., Ltd., Beijing (CN)

(72) Inventors: Wangqiang He, Beijing (CN); Yiwen Ding, Beijing (CN); Yuanyuan Lu, Beijing (CN); Dong Chai, Beijing (CN); Hong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 332 days.

(21) Appl. No.: 18/033,774

(22) PCT Filed: Oct. 30, 2020

(86) PCT No.: PCT/CN2020/125494
§ 371 (c)(1),
(2) Date: Apr. 25, 2023

(87) PCT Pub. No.: WO2022/088096
PCT Pub. Date: May 5, 2022

(65) Prior Publication Data
US 2023/0401692 A1    Dec. 14, 2023

(51) Int. Cl.
*G06T 7/00* (2017.01)
*G06T 7/12* (2017.01)
(Continued)

(52) U.S. Cl.
CPC ............ *G06T 7/0008* (2013.01); *G06T 7/001* (2013.01); *G06T 7/12* (2017.01); *G06T 7/62* (2017.01);
(Continued)

(58) Field of Classification Search
None
See application file for complete search history.

(56) References Cited

U.S. PATENT DOCUMENTS

2017/0098398 A1* 4/2017 Amatsuchi ............. G01R 31/26
2019/0340739 A1* 11/2019 An .......................... G06T 7/001

FOREIGN PATENT DOCUMENTS

CN    102506772 A    6/2012
CN    102749046 A    10/2012
(Continued)

OTHER PUBLICATIONS

PCT/CN2020/125494 international search report.
CN 202080002603.9 first office action dated Jan. 8, 2025.

*Primary Examiner* — Oneal R Mistry
(74) *Attorney, Agent, or Firm* — IPro, PLLC

(57) ABSTRACT

A method and apparatus for measuring the actual area of a defect, and a method and apparatus for testing a display panel. The method for measuring the actual area of a defect includes: acquiring a measurement image of a display panel, wherein the measurement image has a defect region; according to the measurement image, determining the area of defect pixels of the defect in the measurement image and determining the size of reference object pixels of a reference object in the measurement image; and according to the area of the defect pixels, the size of the reference object pixels and the actual size of the reference object, determining the actual area of the defect in the display panel.

12 Claims, 5 Drawing Sheets

(51) Int. Cl.
*G06T 7/62* (2017.01)
*G09G 3/00* (2006.01)
(52) U.S. Cl.
CPC .... *G09G 3/006* (2013.01); *G06T 2207/30121* (2013.01)

(56) References Cited

FOREIGN PATENT DOCUMENTS

| | | | |
|---|---|---|---|
| CN | 106097371 | A | 11/2016 |
| CN | 106228532 | A | 12/2016 |
| CN | 107918216 | A | 4/2018 |
| CN | 108154510 | A | 6/2018 |
| CN | 109636800 | A | 4/2019 |
| CN | 110579477 | A | 12/2019 |
| CN | 111696057 | A | 9/2020 |
| JP | 2000221111 | A | 8/2000 |
| JP | 2005249946 | A | 9/2005 |

* cited by examiner

METHOD FOR MEASURING ACTUAL AREA OF DEFECT, AND METHOD AND APPARATUS FOR TESTING DISPLAY PANEL

CROSS-REFERENCE TO RELATED APPLICATIONS

This application is a National Stage of International Application No. PCT/CN2020/125494, filed Oct. 30, 2020, which is hereby incorporated by reference in its entirety.

FIELD

The present disclosure relates to the technical field of inspection, and in particular to a method for measuring an actual area of a defect, and a method and device for inspecting a display panel.

BACKGROUND

With advancing display technology, display panels have been applied in a wide range. During practical application, it is required to inspect the display panel for a defect in a manufacturing process. Typically, the defect of the display panel, which is generally small-sized, is manually measured by workers with low precision. Moreover, under the impact of work experience, visual fatigue, etc., measurement results obtained by different workers possibly vary, resulting in sizable errors and low precision.

SUMMARY

An embodiment of the present disclosure provides a method for measuring an actual area of a defect. The method include: acquiring an inspection image of a display panel, where the inspection image has a defect region; determining a defect pixel area of the defect in the inspection image and a reference object pixel size of a reference object in the inspection image according to the inspection image; and determining the actual area of the defect in the display panel according to the defect pixel area, the reference object pixel size, and an actual size of the reference object.

In some examples, the determining a defect pixel area of the defect in the inspection image specifically includes: determining a pixel region covered by the defect in the inspection image; determining the total number of pixels covered by the pixel region in the inspection image; and determining the defect pixel area of the defect in the inspection image according to a predetermined area of pixels in the inspection image and the total number of pixels covered by the pixel region in the inspection image.

In some examples, the pixel region covered by the defect in the inspection image is determined through an image semantic segmentation network.

In some examples, the defect pixel area of the defect in the inspection image is determined according to the predetermined area of pixels in the inspection image and the total number of pixels covered by the pixel region in the inspection image through the following formula:

$Pa=M*Spxa$, where Spxa denotes the predetermined area of pixels in the inspection image, M denotes the total number of pixels covered by the pixel region in the inspection image, and Pa denotes the defect pixel area.

In some examples, the determining a reference object pixel size of a reference object in the inspection image specifically includes: converting the inspection image into a gray image; determining a gray value corresponding to each pixel in each row in the gray image; transforming the gray value corresponding to each pixel in each row into an initial transformed value; determining a plurality of initial connected components according to the initial transformed value; and calculating a target connected component size according to the plurality of initial connected components, so as to serve as the reference object pixel size.

In some examples, the transforming the gray value corresponding to each pixel in each row into an initial transformed value specifically includes: expressing a gray value corresponding to a pixel in an ith row as an initial row vector Ii, where $I_i=[a_1, a_2, \ldots, a_j, \ldots, \text{and } a_J]$, $a_j$ denotes a gray value corresponding to a jth pixel in the ith row, $1 \leq j \leq J$, J denotes the total number of pixels in the ith row, $1 \leq i \leq Y$, i denotes an integer, and Y denotes the total number of pixel rows of the display panel; and transforming a gray value of the initial row vector Ii of the ith row into the initial transformed value through the following formulas:

$$th = [\max(I_i) + \min(I_i)]/2,$$

$$I_i' = [b_1, b_2, \ldots, b_j, \ldots, \text{and } b_J], \text{ and}$$

$$b_j = \begin{cases} 1 & I_i(a_j) \geq th \\ 0 & I_i(a_j) < th \end{cases},$$

where $b_j$ denotes an initial transformed value corresponding to the jth pixel in the ith row, $\max(I_i)$ denotes a maximum gray value corresponding to a pixel in the ith row, $\min(I_i)$ denotes a minimum gray value corresponding to a pixel in the ith row, th denotes a gray threshold, $I_i(a_j)$ denotes the gray value corresponding to the jth pixel in the ith row, and $I_i'$ denotes a target row vector obtained after the gray value of the initial row vector Ii is transformed into the initial transformed value.

In some examples, the determining a plurality of initial connected components according to the initial transformed value specifically includes: totalizing counts corresponding to the ith row based on a rule that a count is performed once under the condition that initial transformed values corresponding to two adjacent pixels in the ith row in the gray image are different, where $1 \leq i \leq Y$, i denotes an integer, and Y denotes the total number of pixel rows of the display panel; taking the ith row as a target row when the total number of counts corresponding to the ith row is less than a count threshold; and determining the plurality of initial connected components according to initial transformed values corresponding to each target row.

In some examples, the calculating a target connected component size according to the plurality of initial connected components specifically includes: acquiring sizes of the plurality of initial connected components based on the plurality of initial connected components; determining, for the size of each initial connected component, a connected component difference between the size of the initial connected component and the size of each remaining initial connected component; and determining the total number of connected component differences, less than a connected component threshold, among all connected component differences corresponding to the sizes of all the initial connected components, and taking a size, corresponding to the maximum total number of the connected component differences, of the initial connected component as the target connected component size.

In some examples, the determining the actual area of the defect in the display panel according to the defect pixel area, the reference object pixel size, and an actual size of the reference object specifically includes: determining the actual area of the defect in the display panel through the following formula:

$$Ra=Pa*(Ref/Rp)^2,$$

where Ra denotes the actual area of the defect in the display panel, Pa denotes the defect pixel area, Ref denotes a predetermined actual size of the reference object, and Rp denotes the reference object pixel size of the reference object in the inspection image.

An embodiment of the present disclosure provides a method for inspecting a display panel. The method includes: collecting an inspection image of a current display panel; determining an actual area of a defect in the current display panel when it is determined that a defect region exists in the inspection image, where the actual area of the defect in the current display panel is determined through the method for measuring an actual area of a defect described above; determining whether the actual area is greater than an actual threshold; if yes, determining the current display panel corresponding to the inspection image as a defective display panel; and if not, determining the current display panel corresponding to the inspection image as a qualified display panel.

In some examples, the actual threshold is determined based on a predetermined area ratio (AR) of the current display panel, the area ratio (AR) satisfying the following formula:

$$AR=Pa/Spxa,$$

where Pa denotes a defect pixel area, and Spxa denotes an actual area of pixels of the current display panel.

An embodiment of the present disclosure provides a device for measuring an area of a defect. The device include: an image acquisition circuit configured for acquiring an inspection image of a display panel, where the inspection image has a defect region; an intermediate determination circuit configured for determining a defect pixel area of the defect in the inspection image and a reference object pixel size of a reference object in the inspection image according to the inspection image; and an actual area determination circuit configured for determining an actual area of the defect in the display panel according to the defect pixel area, the reference object pixel size, and an actual size of the reference object.

An embodiment of the present disclosure provides a device for inspecting a display panel. The device includes: a display driving circuit configured for collecting an inspection image of a current display panel; a defect area measurement circuit configured for determining an actual area of a defect in the current display panel when it is determined that a defect region exists in the inspection image, where the actual area of the defect in the current display panel is determined through the method for measuring an actual area of a defect described above; and a determination circuit configured for determining whether the actual area is greater than an actual threshold, if yes, determining the current display panel corresponding to the inspection image as a defective display panel, and if not, determining the current display panel corresponding to the inspection image as a qualified display panel.

An embodiment of the present disclosure provides a computer non-transitory readable storage medium, storing a computer program, where the computer program implements steps of the method for measuring an actual area of a defect described above or steps of the method for inspecting a display panel described above when executed by a processor.

An embodiment of the present disclosure provides a computer apparatus, including a memory, a processor, and a computer program stored on the memory and runnable on the processor, where the processor implements steps of the method for measuring an actual area of a defect described above or steps of the method for inspecting a display panel described above when executing the computer program.

DETAILED DESCRIPTION OF THE EMBODIMENTS

Figure 1:
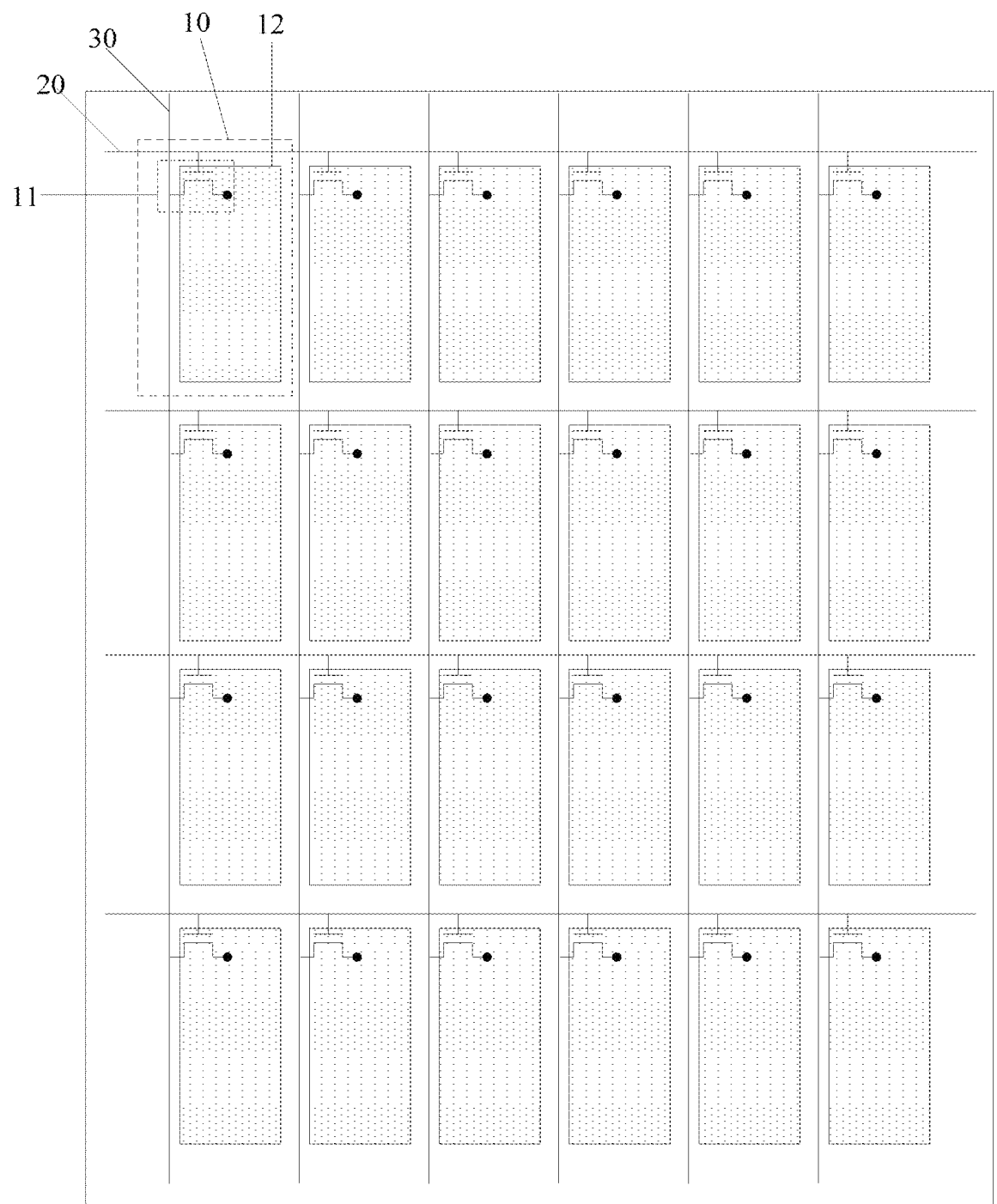
FIG. 1 is a schematic structural diagram of a display panel according to an embodiment of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. Apparently, the described embodiments are some embodiments rather than all embodiments of the present disclosure. Moreover, the embodiments in the present disclosure and features in the embodiments can be combined mutually without conflict. All other embodiments derived by a person of ordinary skill in the art based on the described embodiments of the present disclosure without creative efforts should fall within the scope of protection of the present disclosure.

Unless otherwise defined, technical terms or scientific terms used in the present disclosure should have ordinary meanings understood by those of ordinary skill in the art to which the present disclosure belongs. Words "first", "second", etc. used in the present disclosure do not denote any order, number, or importance, but are merely used to distinguish between different components. Words "comprise", "include", "encompass", etc. mean that elements or items before the word encompass elements or items listed after the word and their equivalents, but do not exclude other elements or items. Words "connection", "connected", etc. are not restricted to physical or mechanical connections, but can include direct or indirect electrical connections.

It is to be noted that sizes and shapes of all graphs in the accompanying drawings do not reflect true scales, and are merely to illustrate contents of the present disclosure. Moreover, the same or similar reference numerals denote the same or similar elements or elements having the same or similar function throughout.

Generally, a display panel is provided with an array substrate and an opposite substrate which are arranged opposite each other. Exemplarily, as shown in FIG. 1, the array substrate generally includes a plurality of pixels 10 distributed in an array, these pixels 10 being capable of being periodically arranged in a row direction and a column direction. The array substrate may further include: a gate line 20 extending in the row direction and arranged corresponding to each row of pixels 10, and a data line 30 extending in the column direction and arranged corresponding to each column of pixels 10. The pixel 10 generally includes a thin film transistor 11 and a pixel electrode 12. A gate, a source, and a drain of the thin film transistor 11 are electrically connected to a corresponding gate line 20, a corresponding data line 30, and a corresponding pixel electrode 12, respectively, so that a data signal transmitted by the data line 30 is supplied to the pixel electrode 12 under the control of an on-off scanning signal transmitted by the gate line 20.

In a production process of the display panel, under the impact of a complex production procedure, a production technology, and a factory environment, foreign matter (such as dust) may exist in the pixels, which may cause a display defect that is readily recognizable by naked eyes in a display screen, thereby greatly influencing an image display quality. For example, in a production process of the array substrate, under the impact of a complex production procedure, a production technology, and a factory environment, foreign matter may exist in the pixels, which may cause a display defect that is readily recognizable by naked eyes in a display screen, thereby greatly influencing an image display quality. Typically, an actual area of the defect, which is generally small-sized, is manually measured by workers with low precision. Moreover, under the impact of work experience, visual fatigue, etc., measurement results obtained by different workers possibly vary, resulting in sizable errors and low precision.

Figure 2:
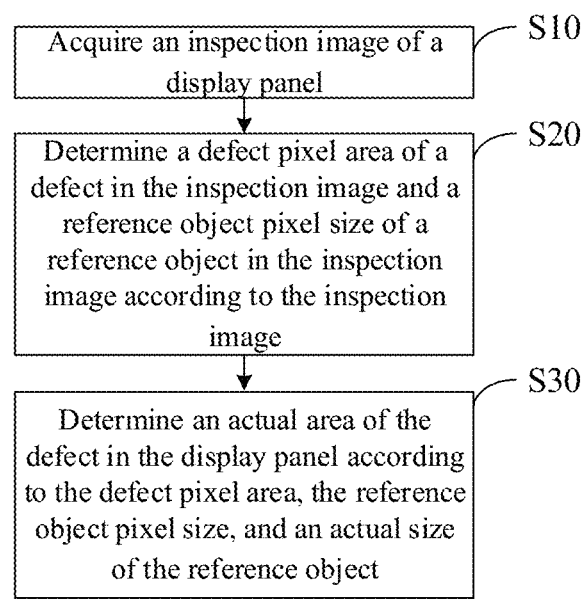
FIG. 2 shows some flowcharts of a method for measuring an actual area of a defect according to an embodiment of the present disclosure.

An embodiment of the present disclosure provides a method for measuring an actual area of a defect. As shown in FIG. 2, the method may include:
 S10, an inspection image of a display panel is acquired, where the inspection image has a defect region;
 S20, a defect pixel area of the defect in the inspection image and a reference object pixel size of a reference object in the inspection image are determined according to the inspection image;
 S30, the actual area of the defect in the display panel is determined according to the defect pixel area, the reference object pixel size, and an actual size of the reference object.

In the method for measuring an actual area of a defect according to embodiments of the present example, the defect pixel area of the defect in the inspection image and the reference object pixel size of the reference object in the inspection image may be determined according to the inspection image having a defect region. Therefore, the actual area of the defect in the display panel may be automatically determined according to the determined defect pixel area, the determined reference object pixel size, and the actual size of the reference object, so that an error in the obtained actual area of the defect in the display panel may be reduced, and the precision may be improved.

It is to be noted that as shown in FIG. 1, a portion, having a display panel image, in the inspection image includes a plurality of periodically-arranged pixels 10. For the prepared display panel, the sizes (such as a length, a width, or an area) of the reference object corresponding to the display panel are known. Therefore, with the single periodically-arranged pixel 10 as a reference object, the actual area of the region corresponding to the defect in the display panel may be calculated.

During practical application, the display panel in a preparation process may be photographed through an image inspection apparatus. For example, the array substrate in a preparation process is photographed through the image inspection apparatus, so as to obtain and store the inspection images. Then it may be determined whether the defect exists in the inspection image and a type of the defect.

Figure 3:
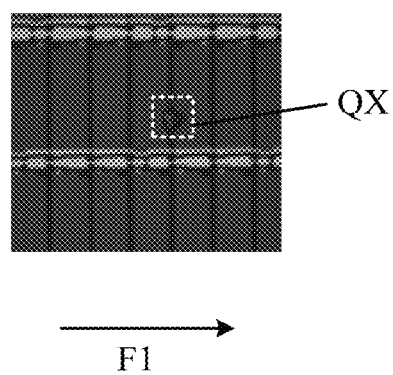
FIG. 3 shows some schematic diagrams of an inspection image according to an embodiment of the present disclosure.

In some examples, during specific implementation, the inspection image acquired in step S10 may be an inspection image having a defect. For example, the inspection image may be an image having a defect determined through the image inspection apparatus. Further, the inspection image may be a color image. As shown in FIG. 3, one inspection image is illustrated, in which a defect region may be a region, in the inspection image, of a defect QX (for example, foreign matter) existing in the display panel.

Figure 4:
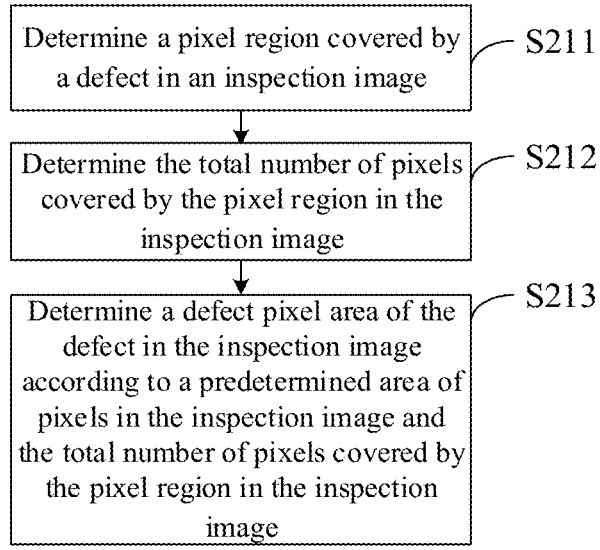
FIG. 4 shows some other flowcharts of a method for measuring an actual area of a defect according to an embodiment of the present disclosure.

In some examples, as shown in FIG. 4, during specific implementation, the step that a defect pixel area of the defect in the inspection image may specifically include:
 S211, a pixel region covered by the defect in the inspection image is determined;
 S212, the total number of pixels covered by the pixel the inspection image is determined;
 S213, the defect pixel area of the defect in the inspection image is determined according to a predetermined area of pixels in the inspection image and the total number of pixels covered by the pixel region in the inspection image.

In some examples, during specific implementation, the pixel region covered by the defect in the inspection image may be determined through an image semantic segmentation network. Exemplarily, the pixel region covered by the defect in the inspection image may be determined through the image semantic segmentation network formed by a U-net network. A general inspection image may be formed by a plurality of pixels arranged in the row direction and the column direction. Exemplarily, as shown in FIG. 3, the pixel region covered by the defect in the inspection image is a region of pixels coverable by the defect in the inspection image. The total number of pixels covered by the pixel region in the inspection image is the total number of pixels covered by the defect QX in the inspection image, that is, the total number of pixels encompassed in the defect region QX in the inspection image. It is to be noted that the image semantic segmentation network may distinguish pixels of the defect region in the inspection image from pixels at other positions, so as to obtain the pixel region covered by the defect in the inspection image.

Exemplarily, a training method for forming the U-net network into the image semantic segmentation network may include: firstly, a standard image semantic segmentation network formed based on the U-net network is constructed, and an initialization parameter, a loss function, and an optimizer of the image semantic segmentation network are set. The loss function may be a binary cross-entropy function, and the optimizer may be a root mean square Prop (RMSProp) algorithm. A data set required for training is selected. The data set includes a plurality of image samples having defects, and the image samples in the data set are divided into a training image sample set, a verification image sample set, and a test image sample set at a ratio of 8:1:1. The training image sample set is input into the to-be-trained image semantic segmentation network formed by the U-net network, so as to train the image semantic segmentation network formed by the U-net network. Moreover, in a training process, at least one of data enhancement methods including image flipping, random cropping, translation transformation, and contrast transformation is employed. After each training, the verification image sample set is input into a currently-trained image semantic segmentation network for verification. After training and verification processes are repeated a plurality of times, the test image sample set is input into a repeatedly-trained and verified image semantic segmentation network for testing. If a tested image semantic segmentation network satisfies a test condition, it is determined that the image semantic segmentation network is trained. A trained image semantic segmentation network is stored after training. In this way, the total number of pixels covered by the defect in the inspection image may be determined through the trained image semantic segmentation network.

Exemplarily, the step that a data set required for training is selected may be performed through the following method: the plurality of image samples having defects are acquired, and each type of defect in the plurality of acquired image samples having defects is correspondingly labeled with a certain number of image samples through a label me tool. Labeled image samples undergo data cleaning (for example, the labeled image samples may be cleaned manually according to a threshold definition of each defect). A data cleaning network is constructed. The data cleaning network is trained through cleaned image samples to obtain a trained data cleaning network. Unlabeled image samples among the plurality of acquired image samples having defects are input into the data cleaning network, so as to determine a pseudo-label corresponding to each image sample and a confidence coefficient corresponding to the pseudo-label. When the confidence coefficient corresponding to the pseudo-label is higher than a confidence coefficient threshold, it is determined that the pseudo-label, determined through the data cleaning network, of the image sample is accurate. Otherwise, manual labeling may be performed.

In some examples, during specific implementation, the defect pixel area of the defect in the inspection image is determined according to the predetermined area of pixels in the inspection image and the total number of pixels covered by the pixel region in the inspection image through the following formula:

$$Pa=M*Spxa,$$

where Spxa denotes the predetermined area of pixels in the inspection image, M denotes the total number of pixels covered by the pixel region in the detection image, and Pa denotes the defect pixel area.

Exemplarily, the area of the pixels in the inspection image may be acquired by actually measuring the pixel in the inspection image. During practical application, areas of pixels in the inspection image obtained through different image inspection apparatuses may be different. Therefore, an area of pixels in an inspection image may be specifically determined according to the inspection image obtained during practical application, which will not be limited herein.

Figure 5:
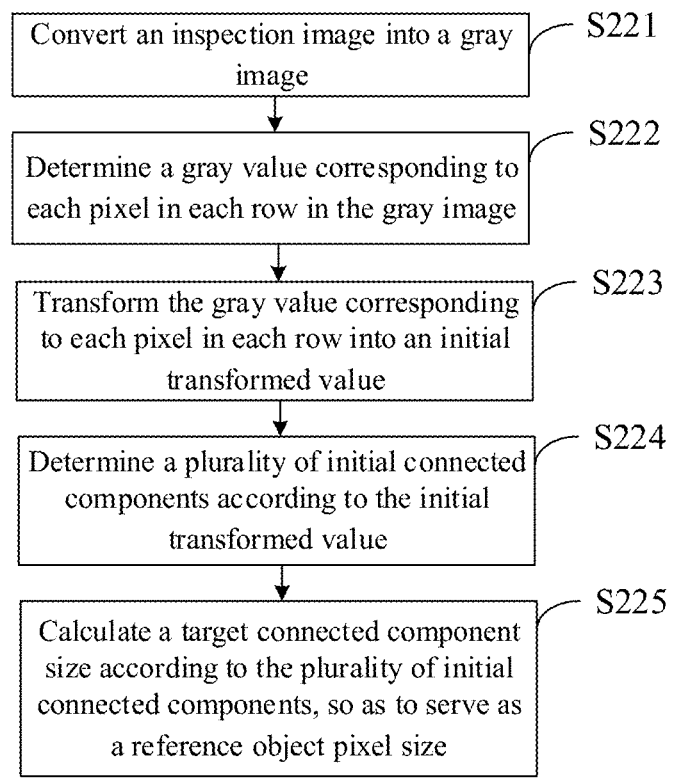
FIG. 5 shows yet other flowcharts of a method for measuring an actual area of a defect according to an embodiment of the present disclosure.

In some examples, during specific implementation, as shown in FIG. 5, the step that a reference object pixel size of a reference object in the inspection image is determined may specifically include:

S221, the inspection image is converted into a gray image;

S222, a gray value corresponding to each pixel in each row in the gray image is determined;

S223, the gray value corresponding to each pixel in each row is transformed into an initial transformed value;

S224, a plurality of initial connected components are determined according to the initial transformed value;

S225, a target connected component size is calculated according to the plurality of initial connected components, so as to serve as the reference object pixel size.

In some examples, during specific implementation, the step that the gray value corresponding to each pixel in each row is transformed into an initial transformed value specifically includes:

a gray value corresponding to a pixel in an ith row is expressed as an initial row vector $I_i$, where $I_i=[a_1, a_2, \ldots, a_j, \ldots,$ and $a_J]$, $a_j$ denotes a gray value corresponding to a jth pixel in the ith row, $1 \leq j \leq J$, J denotes the total number of pixels in the ith row, $1 \leq i \leq Y$, i denotes an integer, and Y denotes the total number of pixel rows of the display panel; and a gray value of the initial row vector $I_i$ of the ith row is transformed into the initial transformed value through the following formulas:

$$th = [\max(I_i) + \min(I_i)]/2,$$

$$I_i' = [b_1, b_2, \ldots, b_j, \ldots, \text{ and } b_J], \text{ and}$$

$$b_j = \begin{cases} 1 & I_i(a_j) \geq th \\ 0 & I_i(a_j) < th \end{cases},$$

where $b_j$ denotes an initial transformed value corresponding to the jth pixel in the ith row, $\max(I_i)$ denotes a maximum gray value corresponding to a pixel in the ith row, $\min(I_i)$ denotes a minimum gray value corresponding to a pixel in the ith row, th denotes a gray threshold, $I_i(a_j)$ denotes the gray value corresponding to the jth pixel in the ith row, and $I_i'$ denotes a target row vector obtained after the gray value of the initial row vector Ii is transformed into the initial transformed value.

Exemplarily, as shown in FIG. 3, all pixels in each row in the inspection image may correspond one-to-one to gray values. In a direction indicated by an arrow F1, the gray values corresponding to the pixels in the ith row in the inspection image may be expressed as: $a_1, a_2, \ldots, a_j, \ldots,$ and $a_J$. The row vector $I_i$ corresponding to the ith row may be expressed as: $I_i=[a_1, a_2, \ldots, a_j, \ldots,$ and $a_J]$. The target row vector $I_i'$ obtained after the row vector $I_i$ corresponding to the ith row is transformed may be expressed as: $I_i'=[b_1, b_2, \ldots, b_j, \ldots,$ and $b_J]$.

Figure 6:
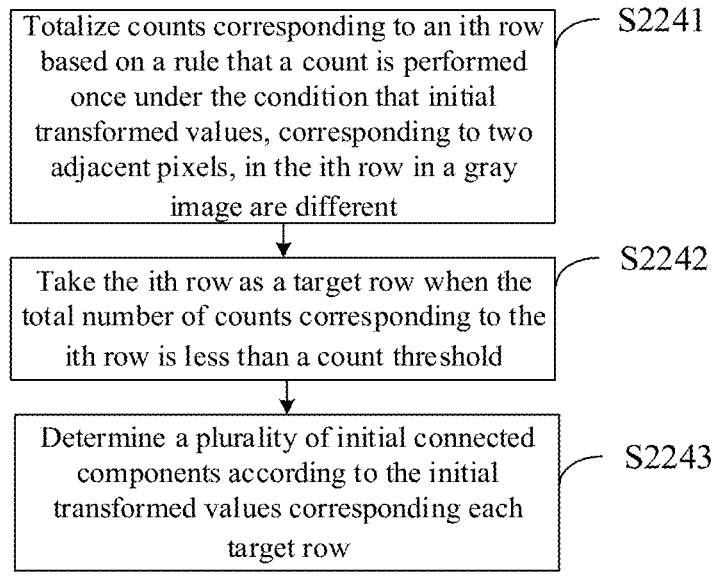
FIG. 6 shows still other flowcharts of a method for measuring an actual area of a defect according to an embodiment of the present disclosure.

In some examples, during specific implementation, as shown in FIG. 6, the step that a plurality of initial connected components are determined according to the initial transformed value specifically includes:

S2241, counts corresponding to the ith row are totalized based on a rule that a count is performed once under the condition that initial transformed values corresponding to two adjacent pixels in the ith row in the gray image are different, where 1≤i≤Y, i denotes an integer, and Y denotes the total number of pixel rows of the display panel;

S2242, the ith row is taken as a target row when the total number of counts corresponding to the ith row is less than a count threshold;

S2243, the plurality of initial connected components are determined according to the initial transformed values corresponding each target row.

In some examples, during specific implementation, the step that counts corresponding to the ith row are totalized based on a rule that a count is performed once under the condition that initial transformed values corresponding to two adjacent pixels in the ith row in the gray image are different may specifically include: the counts corresponding to the ith row are totalized based on a rule that a count is performed once under the condition that two adjacent initial transformed values of the target row vector corresponding to the ith row in the gray image are different. For example, with the target row vector $I_i'=[b_1, b_2, \ldots, b_j, \ldots, \text{and } b_J]$ corresponding to the ith row in the gray image and J=10 as an example, if b1 does not equal b2, a count is performed once. If b2 equals b3, no count is performed. If b3 does not equal b4, a count is performed once. If b4 equals b5, no count is performed. If b5 equals b6, no count is performed. If b6 equals b7, no count is performed. If b7 does not equal b8, a count is performed once. If b8 equals b9, no count is performed. If b9 does not equal b10, a count is performed once. The counts corresponding to the ith row are totalized as 4.

It is to be noted that after a gray array formed by the gray image undergoes the initial transformed value, position regions with an initial transformed value of 1 among the initial transformed values, of adjacent pixels are connected to form the plurality of initial connected components. Each initial connected component may be deemed as a reference object (such as the pixel 10) region. However, the display panel has the defect and a dense wire region, and accordingly, the gray image also includes a defect region and a dense wire region. The size measurement of the reference object will be dramatically influenced by involving these regions of defects and dense wire regions as well, and thus the initial connected components are required to be further filtered.

In some examples, during specific implementation, the step that a target connected component size is calculated according to the plurality of initial connected components specifically includes:

sizes of the plurality of initial connected components are acquired based on the plurality of initial connected components;

for the size of each initial connected component, a connected component difference between the size of the initial connected component and the size of each remaining initial connected component is determined; and the total number of connected component differences, less than a connected component threshold, among all connected component differences corresponding to the sizes of all the initial connected components is determined, and a size, corresponding to the maximum total number of the connected component differences, of the initial connected component is taken as the target connected component size.

In some examples, areas of the plurality of initial connected components may be counted through depth-first search (DFS). The depth-first search is an algorithm for traversing or searching for a tree or graph. Nodes of the tree are traversed in a depth direction of the tree, so as to search for branches of the tree as deep as possible. When all edges of node v have been searched for or the nodes do not satisfy conditions during search, the search will be traced back to a starting node of the edge where node v is found. An entire process is repeated until all nodes are visited. Through the depth-first search, all the initial connected components may be rapidly traversed, and their areas may be counted. In some examples, during specific implementation, the step that the actual area of the defect in the display panel is determined according to the defect pixel area, the reference object pixel size, and an actual size of the reference object specifically includes:

the actual area of the defect in the display panel is determined through the following formula:

$$Ra=Pa*(\text{Ref}/Rp)^2,$$

where Ra denotes the actual area of the defect in the display panel, Pa denotes the defect pixel area, Ref denotes a predetermined actual size of the reference object, and Rp denotes the reference object pixel size of the reference object in the inspection image.

In some examples, during specific implementation, the reference object pixel size of the reference object in the inspection image is determined according to the reference object pixel size (a size of a pixel of the target connected component) and the total number of rows of the target connected component through the following formula:

$$Rp=Ya/K,$$

where Rp denotes the reference object pixel size of the reference object in the inspection image, Ya denotes the reference object pixel size, and K denotes the total number of rows of the target connected component.

Exemplarily, the reference object pixel size may be a width, in the row direction, of the reference object, or a width, in the column direction, of the reference object, which will not be limited herein.

The method for measuring an actual area of a defect according to the embodiment of the present disclosure is described below through an embodiment. It should be understood that the present disclosure is not specifically limited thereto.

The method for measuring an actual area of a defect according to the embodiment of the present disclosure may include followings.

(1) An inspection image of a display panel is acquired.

Exemplarily, the inspection image may be a color image having a defect determined through the image inspection apparatus.

(2) A pixel region covered by the defect in the inspection image is determined through an image semantic segmentation network formed by a U-net network.

Exemplarily, as shown in FIG. 3, a defect QX existing in the inspection image is illustrated. The image semantic segmentation network may distinguish pixels covered by a defect region QX in the inspection image from pixels at other positions.

(3) The total number of pixels covered by the pixel region in the inspection image is determined.

(4) The defect pixel area Pa of the defect in the inspection image is determined through the formula Pa=M*Spxa, where Spxa denotes a predetermined area of pixels in the inspection image, M denotes the total number of pixels covered by the pixel region in the inspection image, and Pa denotes the defect pixel area. Exemplarily, the area of the pixels in the inspection image may be acquired by actually measuring the pixels in the inspection image.

(5) The inspection image undergoes a graying treatment to convert the inspection image into a gray image.

(6) A gray value corresponding to each pixel in each row in the gray image is determined.

Exemplarily, gray values corresponding to all pixels in an ith row may be expressed as $a_1, a_2, \ldots, a_j, \ldots,$ and $a_J$, where $a_j$ denotes a gray value corresponding to a jth pixel in the ith row, $1 \leq j \leq J$, and J denotes the total number of the pixels in the ith row. Exemplarily, with the gray values of 0-255 as an example, $a_j$ may denote one of 0-255.

(7) The gray value corresponding to the pixel in the ith row is expressed as an initial row vector $I_i$, that is, $I_i = [a_1, a_2, \ldots, a_j, \ldots,$ and $a_J]$.

(8) A gray value of the initial row vector Ii of the ith row is transformed as an initial transformed value through the formulas th=[max $(I_i)$+min $(I_i)$]/2, $I_i' = [b_1, b_2, \ldots, b_j, \ldots,$ and $b_J]$, and $$b_j = \begin{cases} 1 & I_i(a_j) \geq th \\ 0 & I_i(a_j) < th \end{cases}.$$

Exemplarily, through the formula described above, $a_1, a_2, \ldots, a_j, \ldots,$ and $a_J$ of $I_i$ may be transformed as 0 or 1. For example, with J=20 as an example, $a_1$ may be transformed as 1, $a_2$ may be transformed as 0, $a_3$ may be transformed as 0, ..., $a_{10}$ may be transformed as 1, $a_{11}$ may be transformed as 1, $a_{12}$ may be transformed as 0, $a_{13}$ may be transformed as 0 ..., and $a_{20}$ may be transformed as 1. Accordingly, a transformed $I_i' = [1, 0, 0, 1, 1, 1, 1, 0, 0, 1, 1, 0, 0, 1, 1, 1, 1, 0, 0, 1]$.

It is to be noted that the gray value undergoes threshold segmentation through the gray threshold th. After the threshold segmentation, positions of pixels of the gate line, the data line, etc., that are not the display panel, of the display panel in the gray image may be denoted by the initial transformed value of 0, and a position of the pixel of the display panel in the gray image may be denoted by the initial transformed value of 1.

(9) Counts corresponding to the ith row are totalized based on a rule that a count is performed once under the condition that initial transformed values, corresponding to two adjacent pixels, of the target row vector corresponding to the ith row in the gray image are different.

Exemplarily, if i=1, with a target row vector $I_i' = [1, 0, 0, 1, 1, 1, 1, 0, 0, 1, 1, 0, 0, 1, 1, 1, 1, 0, 0, 1]$ corresponding to a first row as an example, since $b_1=1$, $b_2=0$, and $b_1$ does not equal $b_2$, a count is performed once. Since $b_2=0$, $b_3=0$, and $b_2$ equals $b_3$, no count is performed. Since $b_3=0$, $b_4=1$, and $b_3$ does not equal $b_4$, a count is performed once. Since $b_4=1$, $b_5=1$, and $b_4$ equals $b_5$, no count is performed. Since $b_5=1$, $b_6=1$, and $b_5$ equals $b_6$, no count is performed. Since $b_6=1$, $b_7=1$, and $b_6$ equals by, no count is performed. Since $b_7=1$, $b_8=0$, and $b_7$ does not equal be, a count is performed once. Since $b_8=0$, $b_9=0$, and $b_8$ equals $b_9$, no count is performed. Since $b_9=0$, $b_{10}=1$, and $b_9$ does not equal $b_{10}$, a count is performed once. Since $b_{10}=1$, $b_{11}=1$, and $b_{10}$ equals $b_{11}$, no count is performed. Since $b_{11}=1$, $b_{12}=0$, and $b_{11}$ does not equal $b_{12}$, a count is performed once. Since $b_{12}=0$, $b_{13}=0$, and $b_{12}$ equals $b_{13}$, no count is performed. Since $b_{13}=0$, $b_14=1$, and $b_{13}$ does not equal $b_{14}$, a count is performed once. Since $b_{14}=1$, $b_{15}=1$, and $b_{14}$ equals $b_{15}$, no count is performed. Since $b_{15}=1$, $b_{16}=1$, and $b_{15}$ equals $b_{16}$, no count is performed. Since $b_{16}=1$, $b_{17}=1$, and $b_{16}$ equals $b_{17}$, no count is performed. Since $b_{17}=1$, $b_{18}=0$, and $b_{17}$ does not equal $b_{18}$, a count is performed once. Since $b_{18}=0$, $b_{19}=0$, and big equals $b_{19}$, no count is performed. Since $b_{19}=0$, $b_{20}=1$, and $b_{19}$ does not equal $b_{20}$, a count is performed once. The counts corresponding to the first row are totalized as 8.

With i=2, and a target row vector $I_i' = [0, 0, 1, 1, 1, 1, 1, 1, 0, 0, 0, 1, 1, 1, 1, 1, 1, 1, 0, 0]$ corresponding to a second row as an example, counts corresponding to the second row are totalized as 4.

With i=3, and a target row vector $I_i' = [0, 0, 1, 1, 1, 1, 1, 1, 0, 0, 0, 1, 1, 1, 1, 1, 1, 1, 0, 0]$ corresponding to a third row as an example, counts corresponding to the third row are totalized as 4.

With i=4, and a target row vector $I_i' = [0, 0, 1, 1, 1, 1, 1, 1, 1, 0, 0, 1, 1, 1, 1, 1, 1, 1, 0, 0]$ corresponding to a fourth row as an example, counts corresponding to the fourth second row are totalized as 4.

With i=5, and a target row vector $I_i' = [0, 0, 1, 1, 1, 1, 1, 1, 1, 0, 0, 1, 1, 1, 1, 1, 1, 1, 0, 0]$ corresponding to a fifth row as an example, counts corresponding to the fifth row are totalized as 4, and so on, so that counts corresponding to the remaining rows may be totalized, which will not be repeated herein.

It is to be noted that although the gray value is transformed into the initial transformed value, in the presence of errors, the initial transformed value of 1 may not denote the position of the pixel of the display panel. Accordingly, by totalizing the counts for the ith row, those with the initial transformed value of 1 but not being the positions of the pixels of the display panel may be removed to improve the precision.

(10) A count threshold may be set as 5, and the ith row is taken as a target row when the total number of counts corresponding to the ith row is less than the count threshold. The second row to the fifth row may be taken as target rows.

It is to be noted that the count threshold may be designed and determined according to requirements of the practical application, which will not be limited herein.

(11) A plurality of initial connected components are determined according to the initial transformed values corresponding each target row. Exemplarily, the plurality of initial connected components may be determined according to pixels, corresponding to the initial transformed value of 1, in each target row.

(12) Sizes of the plurality of initial connected components are acquired based on the plurality of initial connected components described above.

Exemplarily, the initial connected component sizes may be initial connected component areas. The initial connected component area may be taken as an initial area of the pixels of the display panel in the inspection image.

Exemplarily, for each target row, initial transformed values, adjacent to the initial transformed value of 1, in the target row are divided into a transformed value set, and the areas of all pixels, having the initial transformed value of 1 in transformed value sets in the same occurrence order in all the target rows, in the inspection image are the initial connected component sizes. For example, initial transformed values, adjacent the initial transformed value of 1, in the second row to the firth row are divided into one transformed value set, so that the second row to the firth row may each have two transformed value sets. A first transformed value set in the second row includes initial transformed values of 1, 1, 1, 1, 1, and 1. A second transformed value set in the second row includes initial transformed values of 1, 1, 1, 1, 1, 1, and 1.

A first transformed value set in the third row includes initial transformed values of 1, 1, 1, 1, 1, 1. A second transformed value set in the third row includes initial transformed values of 1, 1, 1, 1, 1, 1, 1.

A first transformed value set in the fourth row includes initial transformed values of 1, 1, 1, 1, 1, 1, 1. A second transformed value set in the fourth row includes initial transformed values of 1, 1, 1, 1, 1, 1, 1.

A first transformed value set in the fifth row includes initial transformed values of 1, 1, 1, 1, 1, and 1. A second transformed value set in the fifth row includes initial transformed values of 1, 1, 1, 1, 1, 1, 1, and 1.

Accordingly, a total area (that is, a total area of 25 pixels in the inspection image) of all pixels, having the initial transformed value of 1 in the first transformed value sets in the second row to the fifth row, in the inspection image may be taken as a first initial connected component size.

A total area (that is, a total area of 29 pixels in the inspection image) of all pixels, having the initial transformed value of 1 in the second transformed value sets in the second row to the fifth row, in the inspection image may be taken as a second initial connected component size.

Similarly, a third initial connected component size, a fourth initial connected component size, a fifth initial connected component size, a sixth initial connected component size, etc. may be obtained, which will not be repeated herein.

(13) For the size of each initial connected component, a connected component difference between the size of the initial connected component and the size of each remaining initial connected component is determined.

Exemplarily, with the initial connected component size as the initial connected component area and having six initial connected component areas as an example, for the first initial connected component area, a connected component difference between the first initial connected component area and the second initial connected component area, a connected component difference between the first initial connected component area and the third initial connected component area, a connected component difference between the first initial connected component area and the fourth initial connected component area, a connected component difference between the first initial connected component area and the fifth initial connected component area, and a connected component difference between the first initial connected component area and the sixth initial connected component area may be calculated.

For the second initial connected component area, a connected component difference between the second initial connected component area and the first initial connected component area, a connected component difference between the second initial connected component area and the third initial connected component area, a connected component difference between the second initial connected component area and the fourth initial connected component area, a connected component difference between the second initial connected component area and the fifth initial connected component area, and a connected component difference between the second initial connected component area and the sixth initial connected component area may be calculated, and so on, which will not be repeated herein.

(14) The total number of connected component differences, less than a connected component threshold, among all the connected component differences corresponding to the sizes of all the initial connected components is determined, and a size, corresponding to the maximum total number of the connected component difference, of the initial connected component is taken as a target connected component size. The target connected component size is a target connected component area, which may be taken as the reference object pixel size. It is to be noted that the reference object pixel size may be the obtained precise area of the pixels of the display panel in the inspection image. Certainly, during practical application, the reference object pixel size may be a length in the column direction or a width in the row direction of the inspection image of the pixel of the display panel, which will not be limited herein.

Exemplarily, the total number of connected component differences, less than the connected component threshold, among all the connected component differences corresponding to the first initial connected component area is 2. The total number of connected component differences, less than the connected component threshold, among all the connected component differences corresponding to the second initial connected component area is 2. The total number of connected component differences, less than the connected component threshold, among all the connected component differences corresponding to the third initial connected component area is 4. The total number of connected component differences, less than the connected component threshold, among all the connected component differences corresponding to the fourth initial connected component area is 3. The total number of connected component differences, less than the connected component threshold, among all the connected component differences corresponding to the fifth initial connected component area is 3. The total number of connected component differences, less than the connected component threshold, among all the connected component differences corresponding to the sixth initial connected component area is 1. Accordingly, the third initial connected component area may be taken as an actual connected component.

It is to be noted that the connected component threshold may be designed and determined according to requirements of the practical application, which will not be limited herein.

(15) The actual area Ra of the defect in the display panel may be determined through the formula: $Ra=Pa*(Ref/Rp)^2$.

Exemplarily, the reference object may be the pixel in the display panel. A reference distance of the reference object in the inspection image may be a distance, in the column direction, of the pixel in the display panel.

It is to be noted that steps (2)-(4) may be performed before steps (5)-(14). Alternatively, steps (2)-(4) may be performed after steps (5)-(14). Alternatively, steps (2)-(4) may be performed simultaneously with steps (5)-(14), which will not be limited herein.

Figure 7:
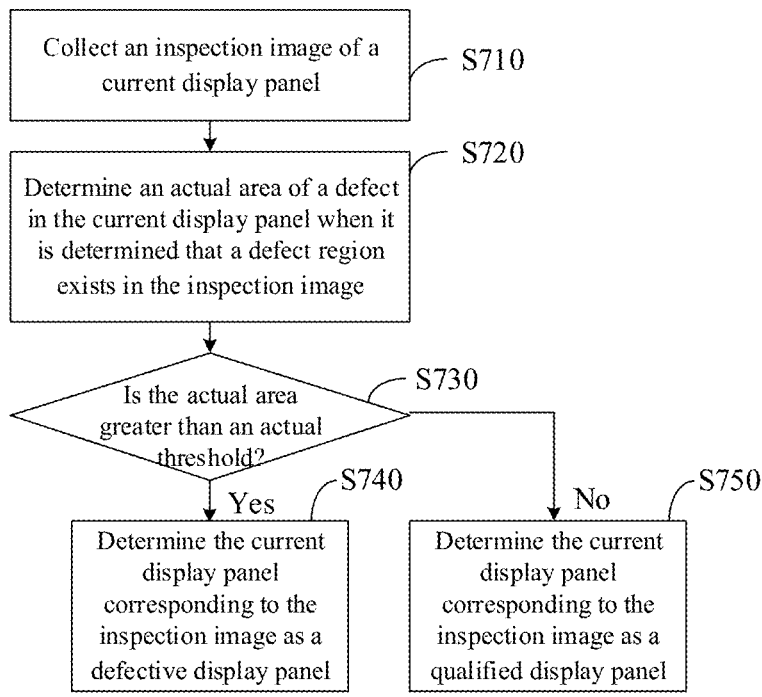
FIG. 7 shows some flowcharts of a method for inspecting a display panel according to an embodiment of the present disclosure.

An embodiment of the present disclosure provides a method for inspecting a display panel. As shown in FIG. 7, the method may include:

S710, an inspection image of a current display panel is collected;

S720, an actual area of a defect in the current display panel is determined when it is determined that a defect region exists in the inspection image, where the actual area of the defect in the current display panel is determined through the method for measuring an actual area of a defect described above;

S730, whether the actual area is greater than an actual threshold is determined, if yes, step S740 is executed, if not, step S750 is executed;

S740, the current display panel corresponding to the inspection image is determined as a defective display panel;

S750, the current display panel corresponding to the inspection image is determined as a qualified display panel.

In the method for inspecting a display panel according to the embodiment of the present disclosure, by determining the actual area of the defect in the current display panel, when it is determined that the actual area of the defect in the current display panel is greater than the actual threshold, it may be indicated that the defect has a great impact on a quality of the display panel, and accordingly, the current display panel may be determined as the defective display panel. The defective display panel may be repaired or discarded. When it is determined that the actual area of the defect in the current display panel is not greater than the actual threshold, it may be indicated that the defect has a small impact on a quality of the display panel, and accordingly, the current display panel may be determined as the qualified display panel. The qualified display panel may be delivered to a next procedure.

In some examples, since different types of display panels have different requirements on the quality under the impact of the defect, during specific implementation, the actual threshold may be designed and determined according to a specific type of the display panel.

Exemplarily, a display region of the display panel may be provided with a plurality of pixels, each of which may include a plurality of pixels. In the display panel, the pixels may also be repeatedly arranged in the row direction and the column direction. During specific implementation, the actual threshold may be determined based on a predetermined area ratio (AR) of the current display panel, the area ratio (AR) satisfying the following formula:

$$AR=Pa/Spxa,$$

where Pa denotes a defect pixel area, and Spxa denotes an actual area of pixels of the current display panel.

During specific implementation, the step S720 that an actual area of a defect in the current display panel is determined when it is determined that a defect region exists in the inspection image specifically includes:

the inspection image of the display panel is acquired, where the inspection image has the defect region;

a defect pixel area of the defect in the inspection image and a reference object pixel size of a reference object in the inspection image are determined according to the inspection image; and the actual area of the defect in the display panel is determined according to the defect pixel area, the reference object pixel size, and an actual size of the reference object.

It is to be noted that reference may be made to the description described above for a specific process of the step S720 that an actual area of a defect in the current display panel is determined when it is determined that a defect region exists in the inspection image, which will not be limited herein.

Figure 8:
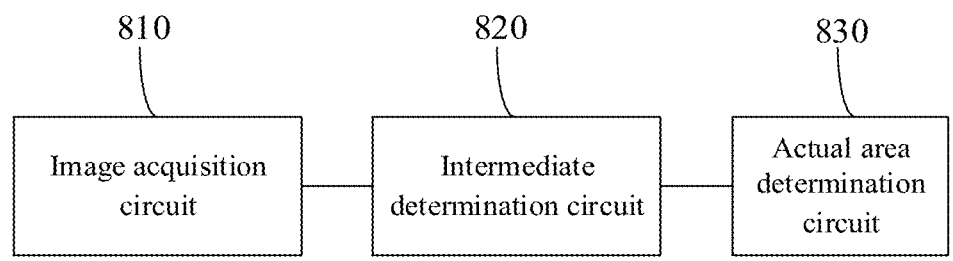
FIG. 8 shows some schematic diagrams of a device for measuring an area of a defect according to an embodiment of the present disclosure.

An embodiment of the present disclosure provides a device for measuring an area of a defect. As shown in FIG. 8, the device may include:

an image acquisition circuit 810 configured to acquire an inspection image of a display panel, where the inspection image has a defect region; exemplarily, the image acquisition circuit 810 may be a camera or an image transmission device; in this way, the inspection image may be acquired through the camera or the image transmission device; certainly, during practical application, a mode for acquiring the inspection image may be designed according to the requirements of practical application, which will not be limited herein;

an intermediate determination circuit 820 configured to determine a defect pixel area of the defect in the inspection image and a reference object pixel size of a reference object in the inspection image according to the inspection image; and an actual area determination circuit 830 configured to determine an actual area of the defect in the display panel according to the defect pixel area, the reference object pixel size, and an actual size of the reference object.

Exemplarily, the intermediate determination circuit and the actual area determination circuit in some embodiments of the present disclosure may employ the form of full hardware embodiments, full software embodiments, or software and hardware combined embodiments.

It is to be noted that the working principle and specific implementation mode of the device for measuring an area of a defect are the same as those of the method for measuring an actual area of a defect in the embodiment described above. Therefore, a working method of the device for measuring an area of a defect may be implemented with reference to the specific implementation mode of the method for measuring an actual area of a defect in the embodiment described above, which will not be repeated herein.

Figure 9:
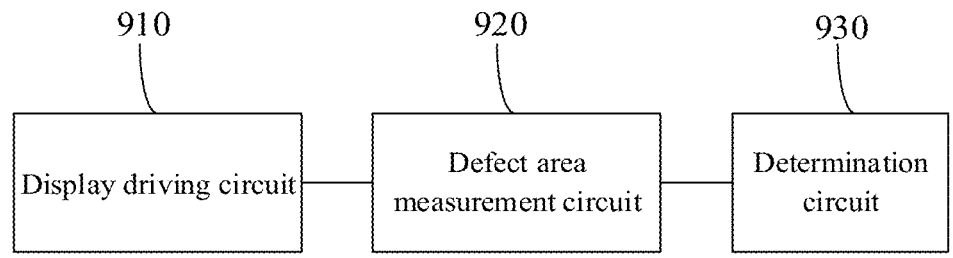
FIG. 9 shows some schematic diagrams of a device for inspecting a display panel according to an embodiment of the present disclosure.

An embodiment of the present disclosure provides a device for inspecting a display panel. As shown in FIG. 9, the device may include:

a display driving circuit 910 configured to collect an inspection image of a current display panel;

a defect area measurement circuit 920 configured to determine an actual area of a defect in the current display panel when it is determined that a defect region exists in the inspection image, where the actual area of the defect in the current display panel is determined through the method for measuring an actual area of a defect described above; and a determination circuit 930 configured to determine whether the actual area is greater than an actual threshold, if yes, determining the current display panel corresponding to the inspection image as a defective display panel, and if not, determining the current display panel corresponding to the inspection image as a qualified display panel.

Exemplarily, the display driving circuit, the defect area measurement circuit, and the determination circuit in the embodiment of the present disclosure may employ the form of full hardware embodiments, full software embodiments, or software and hardware combined embodiments.

It is to be noted that the working principle and specific implementation mode of the device for inspecting a display panel are the same as those of the method for inspecting a display panel in the embodiment described above. Therefore, a working method of the device for inspecting a display panel may be implemented with reference to the specific implementation mode of the method for inspecting a display panel in the embodiment described above, which will not be repeated herein.

Based on the same inventive concept, an embodiment of the present disclosure provides a computer non-transitory readable storage medium, storing a computer program, where the computer program implements steps of the above method for measuring an actual area of a defect or steps of the above method for inspecting a display panel according to the embodiment of the present disclosure when executed by a processor. Specifically, the present disclosure can employ the form of a computer program product that is implemented on one or more computer-available storage media (including, but not limited to, a magnetic disk memory, optical memory, etc.) that encompass computer-available program codes.

Based on the same inventive concept, an embodiment of the present disclosure provides a computer apparatus, including a memory, a processor, and a computer program stored on the memory and runnable on the processor, where the processor implements steps of the above method for measuring an actual area of a defect or steps of the above method for inspecting a display panel according to the embodiment of the present disclosure when executing the computer program.

Those skilled in the art should understand that the embodiments of the present disclosure can be provided as methods, systems, or computer program products. Therefore, the present disclosure can employ the form of full hardware embodiments, full software embodiments, or software and hardware combined embodiments. Moreover, the present disclosure can employ the form of a computer program product that is implemented on one or more computer-available storage media (including, but not limited to, a disk memory, a compact disk read-only memory (CD-ROM), an optical memory, etc.) that encompass computer-available program codes.

The present disclosure is described with reference to flowcharts and/or block diagrams of the methods, apparatuses (systems), and computer program products according to the embodiments of the present disclosure. It should be understood that each flow and/or block in the flowcharts and/or block diagrams and combinations of the flows and/or blocks in the flowcharts and/or block diagrams can be implemented through computer program instructions. These computer program instructions can be provided for a general-purpose computer, a special-purpose computer, an embedded processor, or a processor of another programmable data processing apparatus, to generate a machine. Therefore, the instructions executed by the computer or the processor of another programmable data processing apparatus generate a device for implementing a specified function in one or more flows in the flowcharts and/or in one or more blocks in the block diagrams.

These computer program instructions can also be stored in a computer-readable memory that can guide the computer or another programmable data processing apparatus to work in a specific manner. Therefore, the instructions stored in the computer-readable memory generate a product including an instruction device. The instruction device implements a specified function in one or more flows in the flowcharts and/or one or more blocks in the block diagrams.

These computer program instructions can be loaded onto a computer or another programmable data processing apparatus, so that a series of operations and steps are executed on the computer or another programmable apparatus, thereby generating computer-implemented processing. Therefore, the instructions executed on the computer or another programmable apparatus provide steps for implementing a specified function in one or more flows in the flowcharts and/or one or more blocks in the block diagrams.

Although the preferred embodiments of the present disclosure have been described, a person skilled in the art can make additional alterations and modifications to these embodiments once they know the basic creative concept. Therefore, the appended claims are intended to be interpreted as including the preferred embodiments and all alterations and modifications that fall within the scope of the present disclosure.

Apparently, those skilled in the art can make various modifications and variations to the embodiments of the present disclosure without departing from the spirit and scope of the embodiments of the present disclosure. In this way, if these modifications and variations to the embodiments of the present disclosure fall within the scope of the claims of the present disclosure and their equivalents, it is intended that the present disclosure also encompass these modifications and variations.

What is claimed is:

1. A method for inspecting a display panel, comprising:
   collecting an inspection image of a current display panel, wherein the inspection image comprises a defect region;
   determining an actual area of a defect in the current display panel in response to a defect region existing in the inspection image, wherein the actual area of the defect in the current display panel is determined through a method for measuring the actual area of the defect;
   determining whether the actual area is greater than an actual threshold;
   in response to the actual area being greater than an actual threshold, determining the current display panel corresponding to the inspection image as a defective display panel; and
   in response to the actual area not being greater than an actual threshold, determining the current display panel corresponding to the inspection image as a qualified display panel;
   wherein the method for measuring the actual area of the defect comprises:
   determining a defect pixel area of the defect in the inspection image and a reference object pixel size of a reference object in the inspection image according to the inspection image; and
   determining the actual area of the defect in the current display panel according to the defect pixel area, the reference object pixel size, and an actual size of the reference object.

2. The method for inspecting a display panel according to claim 1, wherein the actual threshold is determined based on a predetermined area ratio, AR of the current display panel, the AR satisfying a following formula:

$$AR=Pa/Spxa,$$

wherein Pa denotes a defect pixel area, and Spxa denotes an actual area of pixels of the current display panel.

3. A computer apparatus, comprising a memory, a processor, and a computer program stored on the memory and runnable on the processor, wherein the processor implements steps of the method for inspecting a display panel according to claim 1 when executing the computer program.

4. The method for inspecting a display panel according to claim 1, wherein the determining the defect pixel area of the defect in the inspection image comprises:

determining a pixel region covered by the defect in the inspection image;

determining a total number of pixels covered by the pixel region in the inspection image; and determining the defect pixel area of the defect in the inspection image according to a predetermined area of pixels in the inspection image and the total number of pixels covered by the pixel region in the inspection image.

5. The method for inspecting a display panel according to claim 4, wherein the pixel region covered by the defect in the inspection image is determined through an image semantic segmentation network.

6. The method for inspecting a display panel according to claim 4, wherein the defect pixel area of the defect in the inspection image is determined according to the predetermined area of pixels in the inspection image and the total number of pixels covered by the pixel region in the inspection image through a following formula:

$$Pa=M*Spxa,$$

wherein Spxa denotes the predetermined area of each pixel in the inspection image, M denotes the total number of pixels covered by the pixel region in the inspection image, and Pa denotes the defect pixel area.

7. The method for inspecting a display panel according to claim 1, wherein the determining a reference object pixel size of a reference object in the inspection image comprises:

converting the inspection image into a gray image;

determining a gray value corresponding to each pixel in each row in the gray image;

transforming the gray value corresponding to each pixel in each row into an initial transformed value;

determining a plurality of initial connected components according to the initial transformed value; and calculating a target connected component size according to the plurality of initial connected components, so as to serve as the reference object pixel size.

8. The method for inspecting a display panel according to claim 7, wherein the transforming the gray value corresponding to each pixel in each row into an initial transformed value comprises:

expressing a gray value corresponding to a pixel in an ith row as an initial row vector $I_i$, wherein $I_i=[a_1, a_2, \ldots, a_j, \ldots,$ and $a_J]$, $a_j$ denotes a gray value corresponding to a jth pixel in the ith row, $1 \leq j \leq J$, J denotes the total number of pixels in the ith row, $1 \leq i \leq Y$, i denotes an integer, and Y denotes a total number of pixel rows of the display panel; and transforming a gray value of the initial row vector Ii of the ith row into the initial transformed value through a following formulas:

$$th = [\max(I_i) + \min(I_i)]/2,$$

$$I'_i = [b_1, b_2, \ldots, b_j, \ldots, \text{ and } b_J], \text{ and}$$

$$b_j = \begin{cases} 1 & I_i(a_j) \geq th \\ 0 & I_i(a_j) < th \end{cases},$$

wherein $b_j$ denotes an initial transformed value corresponding to the jth pixel in the ith row, max ($I_i$) denotes a maximum gray value corresponding to a pixel in the ith row, min ($I_i$) denotes a minimum gray value corresponding to a pixel in the ith row, th denotes a gray threshold, $I_i$ ($a_j$) denotes the gray value corresponding to the jth pixel in the ith row, and $I_i'$ denotes a target row vector obtained after the gray value of the initial row vector $I_i$ is transformed into the initial transformed value.

9. The method for inspecting a display panel according to claim 8, wherein the determining a plurality of initial connected components according to the initial transformed value comprises:

totalizing counts corresponding to the ith row based on a rule that a count is performed once under the condition that initial transformed values corresponding to two adjacent pixels in the ith row in the gray image are different, wherein $1 \leq i \leq Y$, i denotes an integer, and Y denotes the total number of pixel rows of the display panel;

taking the ith row as a target row in response to a total number of counts corresponding to the ith row is less than a count threshold; and determining the plurality of initial connected components according to initial transformed values corresponding to each target row.

10. The method for inspecting a display panel according to claim 7, wherein the calculating a target connected component size according to the plurality of initial connected components comprises:

acquiring sizes of the plurality of initial connected components based on the plurality of initial connected components;

determining, for the size of each initial connected component, a connected component difference between the size of the initial connected component and the size of each remaining initial connected component; and determining a total number of connected component differences, less than a connected component threshold, among all connected component differences corresponding to the sizes of the initial connected components, and taking a size, corresponding to a maximum total number of the connected component differences, of the initial connected component as the target connected component size.

11. The method for inspecting a display panel according to claim 1, wherein the determining the actual area of the defect in the current display panel according to the defect pixel area, the reference object pixel size, and an actual size of the reference object comprises:

determining the actual area of the defect in the current display panel through a following formula:

$$Ra=Pa*(Ref/Rp)^2,$$

wherein Ra denotes the actual area of the defect in the current display panel, Pa denotes the defect pixel area, Ref denotes a predetermined actual size of the reference object, and Rp denotes the reference object pixel size of the reference object in the inspection image.

12. A device for inspecting a display panel, comprising:

a display driving circuit configured to collect an inspection image of a current display panel, wherein the inspection image comprises a defect region;

a defect area measurement circuit configured to determine an actual area of a defect in the current display panel in response to a defect region existing in the inspection image, by determining a defect pixel area of the defect in the inspection image and a reference object pixel size of a reference object in the inspection image according to the inspection image; and determining the actual area of the defect in the current display panel according to the defect pixel area, the reference object pixel size, and an actual size of the reference object;

and a determination circuit configured to determine whether the actual area is greater than an actual threshold, determining the current display panel corresponding to the inspection image as a defective display panel in response to the actual area being greater than an actual threshold, and determining the current display panel corresponding to the inspection image as a qualified display panel in response to the actual area not being greater than an actual threshold.

* * * * *